Feb. 23, 1943.  A. G. LARSON  2,311,842
BRAKE MEANS
Filed June 28, 1941
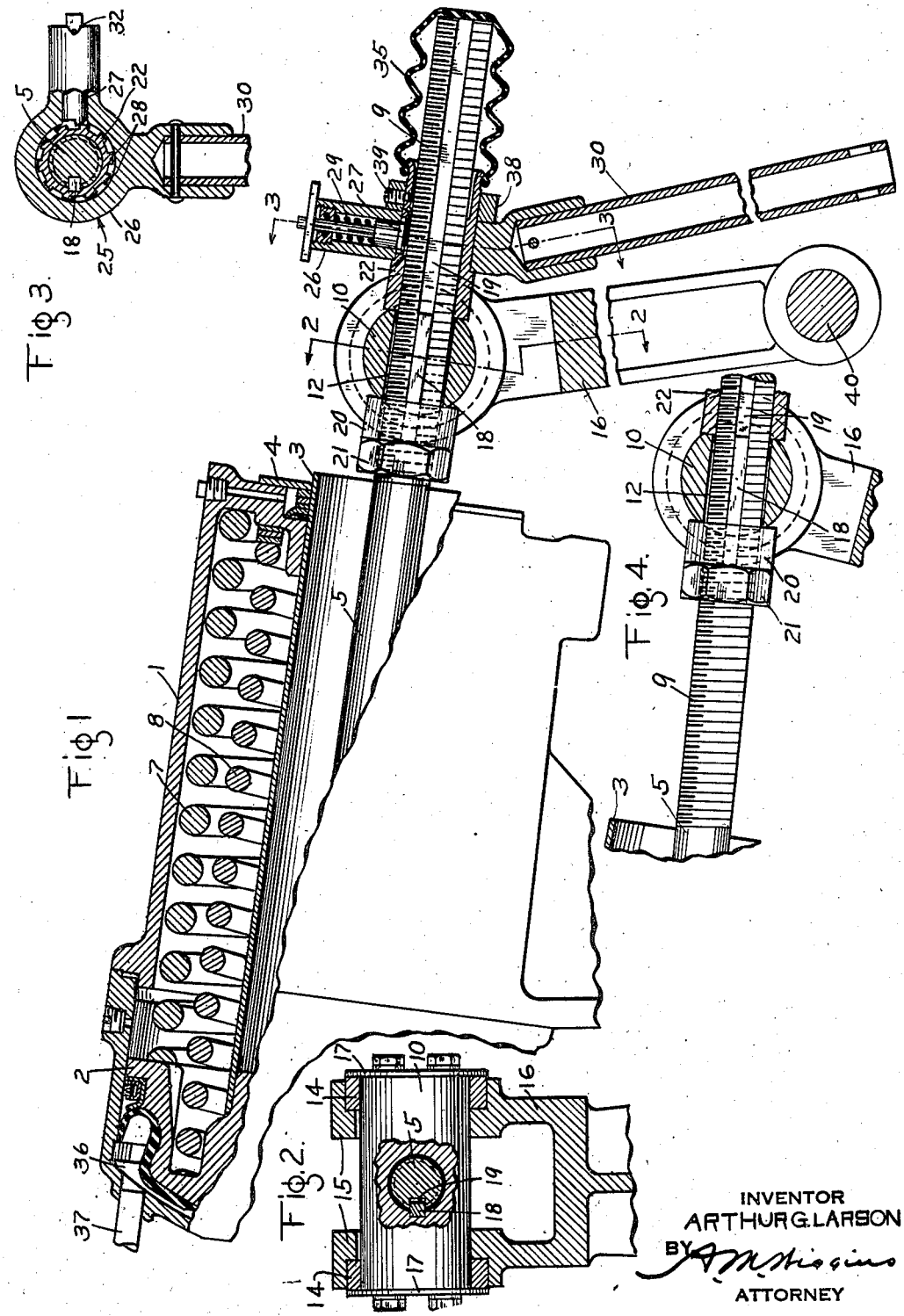
INVENTOR
ARTHUR G. LARSON
BY
ATTORNEY Patented Feb. 23, 1943

2,311,842

UNITED STATES PATENT OFFICE 2,311,842

BRAKE MEANS

Arthur G. Larson, Forest Hills, Pa., assignor to The Westinghouse Air Brake Company, Wilmerding, Pa., a corporation of Pennsylvania Application June 28, 1941, Serial No. 400,159

3 Claims. (Cl. 188—170)

This invention relates to pneumatically controlled brakes for vehicles such as railway cars and train and particularly to brakes of the spring applied fluid pressure released type.

Brakes of this type are automatically applied under control of a spring which tends at all times to apply the brakes and are released by the opposing action of fluid under pressure. The fluid under pressure is under control of the operator in such manner that a reduction in fluid pressure below a predetermined amount will effect an application of the brakes.

Since brakes of this type are operated to their release position and maintained in this position by fluid under pressure, any failure of the control element, control pipe leading therefrom, or the loss of fluid under pressure for any reason whatever, will result in a stuck brake, which under ordinary service conditions could not be readily released.

It is one object of my invention to provide easily accessible means operative manually to readily effect the release of the spring brake independently of the usual release means.

Another object of the invention is to provide a combined manually operative brake releasing means and slack adjuster for spring applied fluid pressure released brake apparatus.

Another object of the invention is to provide a spring applied fluid pressure released brake with mechanical means for rendering it possible to effect a release of the brakes in case of failure of the usual release means.

These objects are attained in the present invention by the use of a ratchet means associated with the brake cylinder piston rod and thereby with the brake rigging, which ratchet means in the present embodiment is manually operative to release the brakes in the event of the loss of fluid under pressure.

A further object of the invention is to provide means employed in conjunction with the above mentioned brake releasing means, for adjusting the brake rigging to take up slack.

This object is attained by providing an adjustable stop located on the brake cylinder piston rod which is adapted to be employed in conjunction with the ratchet means for positioning a rigid one piece brake cylinder lever and thereby the brake rigging to compensate for slack caused by wear of the usual brake shoes and other parts of the rigging.

Other objects and advantages of the invention will be apparent from the following description taken in conjunction with the accompanying drawing, wherein Fig. 1 is a partial sectional view of a portion of a spring applied fluid pressure released brake embodying the invention, the brake cylinder and associated parts being shown in their brake applied position with all slack taken up and the brake cylinder lever in the position it assumes when the usual brake element or shoe is considerably worn.

Fig. 2 is a sectional view taken on the line 2—2 of Fig. 1.

Fig. 3 is a sectional view taken on the line 3—3 of Fig. 1.

Fig. 4 is a fragmentary sectional view showing some of the parts illustrated in Fig. 1 in the position they would assume when the apparatus has been adjusted to accommodate a new or unworn brake element or shoe.

It will be understood that, in brake systems of the aforementioned general type, it is customary to provide a brake cylinder which is operatively connected to one end of a brake cylinder lever, which lever, at its opposite end, is connected to a brake beam or rod and is adapted to function to move friction elements into or out of engagement with a rotating part of the vehicle, such as the tread surface of the car wheel or a rotating disk or drum on the car axle or wheel, to effect either an application or a release of the brakes.

The invention, as will hereinafter more fully appear, is shown associated with the brake cylinder and brake cylinder lever of a brake system of the above mentioned type and since the details of this type of brake system is so well known the parts of the system which are not necessary to a clear understanding of the invention have been omitted from the drawing and the following detailed description of the invention will be limited more or less to what is shown.

As shown in the drawing the brake system may comprise a brake cylinder 1 having slidably mounted therein a piston 2. This piston is provided with a hollow piston rod or stem 3, which is slidably mounted in a suitable bore provided in an end cover 4 of the brake cylinder. A solid pull rod 5, is positioned within the hollow piston rod or stem 3 and is suitably secured in the usual manner to the piston 2 for reciprocation therewith.

Between the end cover 4 and the piston 2 two relatively heavy coiled springs 7 and 8 are provided which, at all times tend to urge the piston 2 toward its inner or brake applying position, in which position it is shown in the drawing.

The outer end of the pull rod 5 is threaded as indicated at 9, and has mounted thereon a movable adjusting pin 10, the pin being provided with an opening 12 through which the pull rod 5 extends. This pin is rockably mounted in bearing members 14 provided in spaced legs or jaws 15 forming one end of a rigid one piece brake cylinder lever 16. This pin is retained in place by means of retaining plates 17 which are arranged one at each end of the pin and which, as clearly shown in Fig. 2 of the drawing, overlaps the pin and the bearing member and are secured to the pin by means of suitable machine bolts.

The pin 10 is preferably provided with a key member 18 which slides in a suitable keyway 19 provided in the pull rod 5. The key member 18 cooperates with the walls of the keyway to prevent rotation of the pull rod 5 relative to the cylinder 1, thereby preventing rotation of the piston 2 within the cylinder thus eliminating the possibility of distortion of the piston packing and springs 7 and 8.

The pin 10 is slidable longitudinally of the pull rod 5 but is normally locked in its adjusted position by means of an adjustable stop nut 20 and an adjusting nut 22, both having screwthreaded connection with the pull rod, the nut 20 being locked in its adjusted position by means of a lock nut 21. The nut 20 normally engages one side of the pin 10 to prevent the pin 10 and thereby the lever 16 from moving inwardly with respect to the rod. The nut 22 engages the opposite side of the pin and prevents the pin and thereby the lever 16 from moving outwardly with respect to the pull rod 5. With the pin thus positioned a rigid connection is formed between the pull rod 5 and the brake cylinder lever 16 so that the lever cannot move relative to the pull rod, thereby eliminating any chattering and undue wear of the parts.

The brake releasing and adjusting mechanism in the present embodiment of the invention besides comprising the nuts 20 and 22 hereinbefore mentioned also comprises a ratchet mechanism 25 for operation of the adjusting nut 22 as will hereinafter more fully appear. This ratchet mechanism may comprise a collar 26 rotatably mounted on the exterior of the nut 22. The collar 26 is held on the nut 22 against movement in one direction longitudinally of the pull rod by a shoulder provided on the nut and is held against longitudinal movement in the opposite direction by a ring 38 which encircles the nut and which is secured to the nut by means of a set screw 39. This collar 26 carries a pawl 27 which is adapted to cooperate with teeth 28 provided on the exterior of the nut 22 and also carries a spring 29 which forces the pawl to its tooth engaging position when the collar is rotated by means of an attached operating handle 30. The opposite end of the pawl 27 extends to the exterior of the collar and is provided with a "T" shaped end which fits into a transverse groove 32 so as to lock the pawl against accidental rotation relative to the collar.

From an inspection of Figs. 1 and 3 of the drawing it will be noted that when the handle 30 is rotated counterclockwise the pawl 27 will cooperate with the teeth 28 to move the nut 22 in the same direction, and when the handle is rotated in the opposite direction, the pawl ratchets over the teeth 28 without moving the nut 22.

When it is desired to render the ratchet mechanism inoperative the T shaped end of the pawl 27 is manually raised out of the transverse groove 32 and rotated 90°. By reason of this movement the pawl is raised and locked out of engagement with the teeth 28.

When it is desired to move the nut 22 in the opposite direction, the pawl 27 must be reversed. To accomplish this the pawl is rotated 180° from the position in which it is shown in the drawing. Now by rotating the handle 30 as before described the nut 22 is caused to move in the desired direction.

A flexible boot or dirt protector 35 is provided at the end of the pull rod 5 to retain lubricant around the rod and protect that portion of the pull rod which extends outwardly beyond the nut 22 from the collection of dust and dirt.

*Operation*

Under normal operating conditions the adjustable pin 10 is locked in position on the pull rod 5 by means of the adjustable stop nut 20 and the nut 22, as shown in Figs. 1 and 4 of the drawing.

Assuming the several parts of the brake cylinder device and the brake cylinder lever to be in their brake applying position as shown in the drawing and it is desired to release the brakes, fluid under pressure is supplied in any desired manner through a pipe 37 to the brake cylinder piston chamber 36. Now when the pressure of fluid in chamber 36 and acting on the face of the brake cylinder piston is increased sufficiently to overcome the opposing force of the springs 7 and 8, the piston and thereby the piston rod, pull rod, pin 10 and connected end of the brake cylinder lever 16 will be caused to move in the direction toward the right hand as viewed in the drawing. The brake cylinder lever as it is thus moved causes rotational movement of the rod 40 thus causing the brake rigging (not shown) to function to release the brakes. It should here be mentioned that when the brake rigging is provided with a release spring for returning the brake cylinder lever and other parts of the brake rigging to their release position, the pull rod will not actuate the lever to its release position but will control its operation.

As long as the chamber 36 is maintained charged to the normal pressure carried, the brakes will be maintained released.

When it is desired to apply the brakes fluid under pressure is vented from the chamber 36 by means of a brake valve device, not shown, or any other desired venting means. With the chamber thus vented the springs 7 and 8 act to move the piston, piston rod and pull rod to their brake applying position as shown in Fig. 1, the nut 22, which moves with the push rod acting to move the pin 10 and thereby the end of the brake cylinder lever to the brake applying position. It will be understood that this movement of the brake cylinder lever causes the several other parts of the brake rigging to function to apply the brakes.

When fluid under pressure is again supplied to the brake cylinder piston chamber 36, the brake cylinder piston will function to effect the brake releasing operation of the brake rigging.

If when the brakes are released the pressure of fluid in chamber 36 should be unintentionally reduced by excessive leakage or as the result of a broken pipe, the springs 7 and 8 will of course act to move the piston and associated brake rigging to their brake applying position in exactly the same manner as hereinbefore described in connection with an intentional reduction in the chamber pressure. This is desirable in that it apprises the operation of a defect in the brake system and brings the car to a stop. Since there is no way to again increase the pressure of fluid in the chamber 36 until the supply pipe can be repaired the brakes cannot be released in the usual manner by fluid under pressure. This is also a very desirable feature in that it maintains the vehicle stopped until the fault in the system is repaired or until the brakes are released manually in a manner which will now be described.

When the vehicle is thus automatically brought to a stop, the operator, if he finds he cannot repair the fluid pressure system, may when it is safe to do so, effect a release of the brakes by rotating the nut 22 in a counterclockwise direction. The rotation of the nut is effected through the medium of the ratchet mechanism 25 which functions to drive the nut 22 in response to a back and forth rocking movement of the handle 30 about the pull rod. It will here be noted that as the nut moves outwardly along the pull rod in response to such rotation it permits the adjustable pin 10 and connected end of the brake cylinder lever 16 to move in the same direction. The brake cylinder lever as it is thus moved causes rotational movement of the rod 40, and permits the brake rigging to function to release the brakes. It will be noted that under these conditions the piston 2 and pull rod 5 are maintained in the position to which they have been actuated by the springs 7 and 8, that is in their brake applying position and will remain in this position until the chamber 36 of the brake cylinder is again charged with fluid under pressure.

When the pressure system has been repaired and it is desired to lock the brake cylinder lever 16 in position on the pull rod 5, the T shaped end of the pawl is raised out of the groove 32 and rotated 180° and permitted to again enter the groove, so that upon suitable manual operation of the handle 30, the ratchet mechanism will act to rotate the nut 22 in a clockwise direction. The nut 22, as it moves inwardly along the pull rod in response to such rotation, will act to move the pin 10 into engagement with the nut 20 thereby moving the brake rigging to its brake applying position. Now when fluid pressure is again supplied to the chamber 36, the brake cylinder piston 2 will function as before described to effect brake releasing operation of the brake rigging.

It is well known that the several parts of a vehicle brake rigging and more particularly the friction brake elements such as the usual brake shoes are subject to considerable wear, and in order to compensate for slack resulting from such wear some means must be provided for maintaining, when the brakes are released, a given clearance between the friction elements or shoes and the rotating part of the vehicle such as the wheel tread or disk or drum carried by the wheel or axle. According to the invention the brake releasing means, before described, is employed for this purpose, as will be apparent from the following description.

Fig. 4 of the drawing shows the location of the brake cylinder lever 16 on the pull rod 5 when the apparatus has been adjusted to accommodate new or unworn braking elements or shoes. Fig. 1 of the drawing shows the location of the brake cylinder lever 16 on the pull rod 5 when all the slack has been taken up and the braking elements or shoes are so worn as to require replacement.

Assuming the brake cylinder lever 16 is positioned to accommodate new or unworn shoes and the vehicle is put in service. During each application of the brakes the braking elements or shoes are subjected to wear and in a relatively short time become worn to a degree where the slack must be taken up.

In order to accomplish this in the present embodiment of the invention it is only necessary to back off the lock nut 21 and adjustable stop nut 20, in the direction toward the cylinder 1 and then by suitable manual operation of the ratchet means cause the nut 22 and consequently the pin 10 and lever 16 to move in the same direction until the desired adjustment is attained. The nut 20 is then screwed into engagement with the pin 10 and the lock nut 21 is screwed into locking engagement with the nut 20.

The slack between the friction elements or shoes and engaging rotating part of the vehicle and also the slack in the rigging due to wear may be periodically taken up in this manner until the brake cylinder lever reaches the position in which it is shown in Fig. 1.

From the foregoing description it will be apparent that I have provided a novel operative connecting arrangement between a brake cylinder pull rod and a brake cylinder lever which is normally positioned so as to provide a rigid connection between the pull rod and the brake cylinder lever, but which is manually releasable to permit a release of the brake cylinder lever so that it will return to brake release position upon suitable manual operation and in addition provide means adapted to cooperate with the manually operative means for taking up slack in the brake rigging.

Having now described my invention, what I claim as new and desire to secure by Letters Patent, is:

1. In a brake system, in combination, a solid one piece brake cylinder lever operative to effect either an application or a release of the brakes, a brake cylinder pull rod screwthreaded at its outer end and operative for actuating said lever, means operatively connecting said pull rod to said brake cylinder lever, said means comprising a pin slidably mounted on said pull rod and a key for preventing relative axial rotation between said pin and said pull rod, a brake cylinder piston for actuating said pull rod, said piston having at one side a chamber and responsive to fluid under pressure in said chamber for actuating said pull rod to actuate said lever to effect a release of the brakes and responsive to a reduction in the pressure of fluid in said chamber for actuating said pull rod to actuate said lever to effect an application of the brakes, a nut having screwthreaded engagement with said pull rod and movable relative to said pull rod in one direction for effecting actuation of said lever to release the brakes and movable relative to said pull rod in the opposite direction for taking up slack in the brake rigging.

2. In a brake rigging for a vehicle, in combination, a brake cylinder lever, a pin rockably carried by said lever and having an opening therein, a brake cylinder device having a pull rod which extends through said opening, means normally locking said pull rod to said pin and being rotatable to permit relative movement between said pin and rod, and means cooperating with said pin and rod to lock said rod against axial movement as said member is rotated.

3. In a brake rigging for a vehicle, in combination, a brake cylinder lever, a pin rockably carried by said lever and having an opening therein located intermediate its ends, a brake cylinder device having a pull rod which extends through said opening, means screwthreaded on said rod and engaging said pin for normally locking said pull rod to said pin and rod, and means cooperating with said pin and rod to at all times lock said rod against axial rotation.

ARTHUR G. LARSON.